United States Patent Office 2,948,686
Patented Aug. 9, 1960

2,948,686

THIXOTROPIC AND FAST BREAKING SKIN CLEANER EMULSION AND PROCESS FOR PRODUCING THE SAME

James L. Gianladis, University City, Mo., assignor to G. H. Packwood Manufacturing Company, St. Louis, Mo., a corporation of Missouri No Drawing. Filed July 14, 1955, Ser. No. 522,170

6 Claims. (Cl. 252—153)

This invention relates to improvements in thixotropic emulsions and, in particular, is concerned with a thixotropic and fast breaking emulsion for use as a nonalkaline, skin compatible and dermatologically nontoxic waterless skin cleaner.

The emulsion of this invention has its principal application in cleaning the hands of industrial workers and mechanics. A very high utility and value are present in the capacity to free the skin of grease, grime and related impurities which are not readily laved with soap and water. An additional value exists in the ability to clean the skin without the employment of water by the user.

The emulsion cleaner is thixotropic in that the act of massaging the cleaner on the skin effects shear which quickly reduces it to a liquid state. The fast breaking quality of the cleaner resides in the fact that when the emulsion is transformed to the fluid state and contacts grease, grime and other soils, it is irrevocably destabilized and is no longer thixotropic and does not revert to the creamy or pasty emulsion form. The resulting fluid mass with the contaminants is then readily wiped off. This emulsion cleans without the use of soaps and is thereby very favorable to the skin due to the absence of any toxic or caustic effects which might be imparted by residual amounts of soaps that would constitute a skin hazard because of their alkalinity where a water rinse is not used.

Thixotropic gels have been known in the past, and these gels are characterized by their nonfluidity when in the standing state and by their fluidity when they are subjected to shear. Such gels, however, have been characterized by their lack of stability and their tendency to settle out or separate due to a number of factors including time and temperature causing chemical change. By means of this invention, it has been found that a thixotropic emulsion of predominantly water-in-oil type can be produced in stable form and used as a skin cleaner without the requirement of the use of any water other than that which is employed in the preparation of the emulsion.

The thixotropic emulsion skin cleaner of this invention is prepared from a modified organic clay complex with an onium base of a class consisting of ammonium, phosphonium, oxonium, sulfonium, arsonium, stibonium and telluronium. This clay complex is used with a polar compound, which may be water, or preferably an organic compound in addition to water, and an organic solvent in the preparation of the thixotropic emulsion. In addition, an emulsifying agent in the form of a detergent is used for best results. In the preparation, an embodiment is achieved through the application of extrusion or shear forces through the use of a homogenizer or a colloid mill. The so-produced emulsion is stable at high temperatures so that its nonfluidity is maintained.

The thixotropic emulsion has the property of very high shear break (pseudoplasticity), so that upon agitation it rapidly becomes fluid. It is low in ionic activity and resistant to rust and may be made more anticorrosive by the addition of certain well-known organic and inorganic anticorrosive agents. Also, it is nonalkaline and may be rendered slightly acid in character so as to fall within the pH range of human skin, which is a desirable attribute. In the use as a cleaner on the skin, it reverts quickly to a liquid state and removes grease and dirt without the employment of additional water other than that which is in the emulsion. The emulsion exhibits a minimum of soil redeposition on the skin while leaving the skin dry and soft with no feel of tackiness or stickiness.

A unique feature of the emulsion lies in the fact that homogenizing may be employed to contribute an embodying effect to the emulsion. The mechanics involved relate to the incorporation of the onium complex into the solvent while emulsified with water, thus creating thixotropic properties which include the water. The mixture is thus converted to a paste with pseudoplastic viscosity characteristics. The resultant emulsion shows unusual stability to heat, cold, aging, vibration, microorganisms, acids, alkalies, and other materials and conditions which tend to destabilize emulsions.

Accordingly, it is a primary object of this invention to provide an effective skin cleaner which has a thixotropic and fast breaking qualities and is in the form of a stable emulsion.

It is a further object of the invention to provide a skin cleaner and method for making the same using an organic onium complex with clay, which is subjected in the preparation to extrusion and shear forces to give a thixotropic and fast breaking emulsion which is stable at varying temperatures.

It is still a further object of this invention to prepare a thixotropic and fast breaking emulsion and to provide a method for producing the same in which a clay complex with an onium compound is utilized with a polar compound and an emulsifying agent with water in a water-in-oil emulsion which is stable at high and low temperatures.

Yet another object of this invention is to provide a waterless skin cleaner and method for preparing the same, in which a suitable thixotropic emulsion is prepared from a clay complex with an onium compound, an organic highly polar compound, an emulsifying agent, and kerosene, in the form of a predominantly water-in-oil emulsion, and wherein the skin cleaner can be used on the hands without the addition of any water to remove grease and dirt. The skin cleaner can then be removed from the hands by wiping with a towel without leaving the cleaner on the hands in any noticeable amount. Also, when the skin cleaner is removed, the skin is left dry and soft with no tackiness or stickiness.

Still a further object of this invention is to provide a skin cleaner from a water-in-oil emulsion having thixotropic and fast breaking qualities in a process which is simple and economic to carry out and requires no complicated chemical reactions. The emulsion can be prepared from standard industrial chemicals in an inexpensive and easily prepared formulation which exhibits stable and improved characteristics when produced.

Further objects of this invention will appear in the detailed description which follows, and will further be apparent to those skilled in the art.

There are listed below for the purpose of illustration a number of examples for the preparation of the water-in-oil thixotropic and fast breaking emulsion of this invention. These examples show the use of an ammonium complex with clay, but it is to be understood that other ammonium complexes may be utilized and that the invention is not limited to the ammonium clay complex, which, however, may be preferred for the purpose of convenience. Likewise, other polar components and emulsifying agents can be used besides those shown in the examples, as will be readily apparent to those skilled in the art.

In this invention the particular ammonium clay complex utilized is dimethyl diocto-decyl ammonium bentonite which has a high percentage of montmorillonite. This ammonium clay complex and the other onium complexes consisting of phosphonium, oxonium, sulfonium, arsonium, stibonium and telluronium may be conventionally prepared as described in Hauser Patent No. 2,531,427, issued November 28, 1950. This patent shows that such onium clay complexes can be used in preparing and thickening organic liquids, but fails to show anything relative to the preparation of a thixotropic and fast breaking water-in-oil emulsion, which is the purpose of this invention for use in a skin cleaner.

To prepare the predominantly water-in-oil emulsion of this invention, it is necessary to have both a water phase and an oil phase. The oil in this phase of the emulsion is a relatively nonpolar organic solvent which may be straight kerosene or a blend of kerosene and mineral spirits. Other solvents may similarly be used where they are compatible in the emulsion and are nonpolar, or at least are not highly polar.

These components are subjected to substantial extrusion or shear forces in a homogenizer or colloid mill in the preparation of the emulsion. This imparts embodiment and a high degree of stability. The application of these forces can be performed on the oil phase solely before it is mixed with the water phase, or solely after the mixing of the two phases. Preferably, however, this treatment is made in both stages. The treatment where used in only one stage appears to be best applied after mixing.

It has been found further that an organic compound more highly polar than water can be substituted for at least part of the physical treatment mentioned above. These polar compounds in liquid form may be used in the amounts of approximately 1% to 20% of the oil phase and may be defined as being an asymmetrical organic molecule, and, as an example, organic compounds containing the groups OH, COOH and $NO_2$ can be employed, as these are generally highly polar in character unless they happen to be completely symmetrical. Ketones also may be used, and as examples of the polar organic compounds which can be employed, isopropyl alcohol, ethyl alcohol, methyl alcohol, and the lower ketones are suitable. Best results are obtained, however, where at least some shear or extrusion forces are applied.

Also, an emulsifying agent in the form of a detergent is desirably employed in the water or oil phase, but preferably in the oil phase. Detergents which are compatible with the emulsion components are employed as the emulsifying agent or agents in the water phase or oil phase, and preferably have the properties of being odorless and water-white, as these are desirable features in the skin cleaning emulsion when used by the ultimate consumer. The presence of a detergent, while not basically essential, greatly contributes to the emulsion by endowing it will the features of substantial improvement in cleaning properties contributed particularly by nonionic emulsifiers, imparting of self-emulsifying properties to the water-in-oil emulsion so it may be flushed from the hands with water, if desired, aiding in dispersing and maintaining in suspension the dimethyl diocto-decyl ammonium bentonite prior to the homogenizing or milling treatment, and facilitating the achievement of a white product by its capacity to reduce and stabilize particle size.

As an example of nonionic detergents that are suitable in the process and product of this invention, the polyoxyethylene esters of stearic and palmitic acids such as Ethofat 60/15 made by Armour Chemical Company and Kyro EO (alkylphenol ethylene oxide condensate nonionic) made by Procter & Gamble, are very satisfactorily employed and give good results. Other examples which are suitable to a lesser degree are triethanolamine sulfate, an anionic detergent, Ethomeen T/15, which is a polyoxyethylene fatty amine cationic detergent made by Armour Chemical Company, and Triton X-100, an alkyl aryl polyether alcohol made by Rohm and Haas Co. These detergents are used to impart hydrophilic properties to this water-in-oil emulsion so it will rinse off the hands with water after use, and also to aid in emulsifying dirt and grease.

For the particular purpose of describing the process of making the formulation of this invention and to give typical examples of the range that can be employed, there will be described below several examples.

The simplest formulation can be made by the use of only water, kerosene and dimethyl diocto-decyl ammonium bentonite.

*Example 1*

| Material | Parts | Grams | Percent weight |
|---|---|---|---|
| Kerosene | 44 | 36 | 39.2 |
| Dimethyl diocto-decyl ammonium bentonite | 2.0 | 2.0 | 2.2 |
| Water | 54 | 54 | 58.2 |
| | | 92 | 99.6 |

The dimethyl diocto-decyl ammonium bentonite is incorporated into kerosene with heat and agitation. Add water to the kerosene and dimethyl diocto-decyl ammonium bentonite mixture with both components at the same approximate temperature. It has been found that 65° C. is desirable. The resultant emulsion is subjected to either extrusion through a homogenizer or shearing with a colloid mill. As an alternative procedure, the kerosene and dimethyl diocto-decyl ammonium bentonite may be first sheared or extruded to embody the kerosene before the water is added. The finished emulsion is preferably sheared or extruded again.

A formula with improved characteristics may be prepared as follows:

*Example 2*

| Material | Parts | Grams | Percent weight |
|---|---|---|---|
| Kerosene | 35.0 | 28.5 | 31.5 |
| Mineral spirits | 6.0 | 4.7 | 5.1 |
| Technical White oil | 3.0 | 2.3 | 2.5 |
| Dimethyl diocto-decyl ammonium bentonite | 2.0 | 2.0 | 2.2 |
| Polyoxyethylene ester of stearic and palmitic acid | 1.0 | 1.0 | 1.1 |
| Diethylene glycol | 5.0 | 5.5 | 6.0 |
| Perfume | 0.2 | 0.2 | 0.2 |
| Water | 47.8 | 47.8 | 52.0 |
| | | 92.0 | 100.6 |

The kerosene, mineral spirits, white oil, dimethyl diocto-decyl ammonium bentonite and polyoxyethylene ester of stearic and palmitic acid are mixed together by heating and agitation. This will be the oil phase.

The water and glycol are then mixed together and heated to approximately 65° C. Add the water phase to the oil phase with agitation, having the temperature of both phases adjusted to the same value, desirably 65° C. Pass the resultant mixture through a colloid mill or homogenizer.

As an alternative, the oil phase may be first passed through a colloid mill or homogenizer, after which the water phase is incorporated with agitation. The resultant emulsion is preferably sheared or extruded again.

Alternative formulations are shown in the following examples in which isopropyl alcohol is employed as a polar organic compound.

Example 3

| Material | Parts | Grams | Percent weight |
|---|---|---|---|
| H₂O | 240 cc | 240 | 52.48 |
| Kerosene | 150 cc | 122.3 | 26.74 |
| Mineral spirits | 75 cc | 59.02 | 12.90 |
| Dimethyl diocto-decyl ammonium bentonite | 7.5 gms | 7.5 | 1.64 |
| Alkyl aryl polyether alcohol | 15 cc | 15.9 | 3.48 |
| Perfume | 1 cc | 0.8 | 0.18 |
| Isopropyl alcohol | 15 cc | 11.77 | 2.58 |
| | | 457.29 | 100.00 |

This material is prepared in the following manner: The kerosene, mineral spirits and the isopropyl alcohol are blended together at about 60° C. so that a uniform liquid mixture is obtained. At this point the dimethyl diocto-decyl ammonium bentonite is added and the entire mixture is rapidly agitated at 60° C. Then the perfume is added. This completes the oil phase operation of the process. Subsequently to the oil phase and still at about 60° C., water with alkyl aryl polyether alcohol detergent at about the same temperature is slowly added to prepare the emulsion in final form. Rapid agitation is maintained for several minutes, at the end of which the preparation is ready for use.

Example 4

| Material | Parts | Grams | Percent weight |
|---|---|---|---|
| Kerosene | 150 cc | 122 | 26.9 |
| Mineral spirits | 70 cc | 55 | 12.1 |
| Lanolin | 5 cc | 4.7 | 1.0 |
| Dimethyl diocto-decyl ammonium bentonite | 7.5 gms | 7.5 | 1.7 |
| Alkyl phenol ethylene oxide condensate | 15 cc | 15.9 | 3.5 |
| Isopropyl alcohol | 15 cc | 11.8 | 2.6 |
| Perfume | 1.0 cc | 0.8 | 0.2 |
| H₂O | 236.5 cc | 236.5 | 52.1 |
| | | 454.2 | 100.1 |

This formulation was prepared in the same manner as indicated in the preparation of Example 3, except that the lanolin was added in the oil phase, together with the kerosene, mineral spirits, and the isopropyl alcohol. Subsequently, the water-in-oil emulsion was prepared in the same manner as previously described for Example 3. This particular preparation shows that lanolin is fully compatible and can be used in the waterless skin cleaner of this invention with very good results.

Example 5

| Material | Parts | Grams | Percent weight |
|---|---|---|---|
| Mineral spirits | 220 cc | 177 | 39.0 |
| Lanolin | 5 cc | 4.7 | 1.0 |
| Dimethyl diocto-decyl ammonium bentonite | 10 gms | 10 | 2.2 |
| Alkyl phenol ethylene oxide condensate | 25 cc | 26.2 | 5.7 |
| Isopropyl alcohol | 15 cc | 11.8 | 2.6 |
| Perfume | 1 cc | .8 | 0.2 |
| H₂O | 224 cc | 224 | 49.4 |
| | | 454.5 | 100.1 |

In this preparation, the only change from Example 4 was in the amount of dimethyl diocto-decyl ammonium bentonite used, which was increased to about 2%, and in the omission of kerosene. Also, the water utilized was reduced slightly.

Example 6

| Material | Parts | Grams | Percent weight |
|---|---|---|---|
| White oil | 220 cc | 177.3 | 39.0 |
| Lanolin | 5 cc | 5 | 1.1 |
| Alkyl phenol ethylene oxide condensate | 25 cc | 26.5 | 5.8 |
| Isopropyl alcohol | 15 cc | 11.77 | 2.6 |
| Perfume | 1 cc | 0.8 | 0.2 |
| P.V.P. (polyvinyl pyrolidone) | 10 gms | 10.0 | 2.2 |
| Citric-20 (20+ citric acid solution) | 10 gms | 10.0 | 2.2 |
| H₂O | 204 cc | 204 | 44.8 |
| Dimethyl diocto-decyl ammonium bentonite | 10 gms | 10 | 2.2 |
| | | 455.37 | 100.1 |

This preparation has citric acid and polyvinyl pyrolidone added to it in the oil phase in the first blending operation, together with the white oil. Also, it will be noted that in this preparation as in the others, the range of the various components is variable. It has been found in this example that the citric acid and the polyvinyl pyrolidone are compatible in the oil phase and can be used to modify the acidity of the emulsion so as to match the pH of the skin and reduce the pH of the formation. The normal pH of the formulations is slightly on the acid side, but can be further modified by this means.

The examples given above are typical formulations, but it is understood that the ranges and percentages may be varied as will be understood by those skilled in the art. However, in general, it should be noted that the percentage of the detergent, where used, should not approach 10% of the emulsion, since at this high percentage there is poor wetting. Also, the percentage of the dimethyl diocto-decyl ammonium bentonite should not be reduced too low, since too weak a gel may then be formed.

As an alternative procedure in the method of formulation, mineral spirits and/or kerosene may be added to the dimethyl diocto-decyl ammonium bentonite and isopropyl alcohol, where employed, and the mixture may then be sheared or homogenized at 90° C. The water phase may then be incorporated in the previously described manner.

The thixotropic emulsions above disclosed are particularly useful in skin cleaners, since no water other than that used in the water-in-oil emulsion is required. This thixotropic emulsion is stable at varying temperatures, but has fast breaking qualities and becomes fluid upon agitation or the development of shear, such as is employed after the emulsion is dispensed to the hand of the user. The rubbing of the hands back and forth effects this shear and renders the emulsion very fluid so that it will then remove dirt, grease and oil from the skin. The formulation can then easily be removed without redeposition of soil on the skin, and the skin is left feeling clean and smooth.

It is obvious that various changes may be made in this invention, as has indicated above. The invention is not limited to the particular ammonium complex with clay, but other onium complexes may be used, as has been indicated previously. Likewise, other relatively nonpolar solvents besides kerosene and mineral spirits may be employed.

Thus, it is apparent, as will be realized by those skilled in the art, that various changes and modifications may be made in this invention without departing from the spirit and scope thereof.

What is claimed is:

1. A skin cleaning thixotropic and fast breaking skin cleaning water-in-oil emulsion composed of 20% to 70% water, 25% to 70% of a liquid, paraffinic, hydrocarbon solvent, a non-ionic hydrophilic organic detergent in an amount less than 10%, a polar organic liquid solvent selected from the group consisting of alcohol ketones, nitro paraffins and fatty acids in an amount up to 10%, and about 2% of an organo-philic quaternary ammonium clay complex, all percentages by weight.

2. A process for preparing a skin cleaning thixotropic and fast breaking water-in-oil emulsion which comprises mixing together 30 to 60 parts of a liquid, paraffinic, hydrocarbon solvent, up to 10 parts of a polar organic liquid solvent selected from the group consisting of alcohols, ketones, nitro paraffins and fatty acids, and less than 10 parts of a non-ionic hydrophilic organic detergent while heating the same, agitating the solution, and adding thereto sequentially with the continued application of heat up to 10 parts of an organophilic quaternary ammonium clay complex, and 30 to 60 parts of warm water and maintaining the pH on the acid side.

3. A skin cleaning thixotropic and fast breaking skin cleaning water-in-oil emulsion composed of 20% to 70% water, 25% to 70% of a liquid, paraffinic, hydrocarbon solvent, a non-ionic hydrophilic organic detergent in an amount less than 10%, an organic liquid polar solvent in an amount up to about 10%, and about 2% of an organophilic quaternary ammonium clay complex, all percentages by weight.

4. A skin cleaning thixotropic and fast breaking skin cleaning water-in-oil emulsion composed of 20% to 70% water, 25% to 70% of a liquid, paraffinic, hydrocarbon solvent, a liquid polar alcohol in an amount up to about 10%, a polyoxy alkylene detergent in an amount less than 10%, and about 2% of an organophilic quaternary ammonium clay complex, all percentages by weight.

5. A thixotropic and fast breaking skin cleaning water-in-oil emulsion characterized by its high thermal stability; comprised of 20% to 70% water, 25% to 75% of liquid, paraffinic, hydrocarbon solvent, a non-ionic hydrophilic organic detergent in an amount less than 10%, and up to 5% of an organophilic quaternary ammonium clay complex, all percentages by weight.

6. A skin cleaning thixotropic and fast breaking skin cleaning water-in-oil emulsion comprised of 20% to 70% water, 25% to 70% of a liquid, paraffinic, hydrocarbon solvent, a liquid polar alcohol in an amount up to about 10%, a non-ionic hydrophilic polyoxy alkylene detergent in an amount less than 10%, and about 2% of dimethyl diocto-decyl ammonium bentonite, all percentages by weight.

References Cited in the file of this patent

UNITED STATES PATENTS

| | | |
|---|---|---|
| Re. 15,944 | Kirschbraun | Nov. 11, 1924 |
| 1,517,577 | Olsson | Dec. 2, 1924 |
| 1,812,074 | Atack | June 30, 1931 |
| 2,197,630 | Carter | Apr. 16, 1940 |
| 2,531,427 | Hauser | Nov. 28, 1950 |
| 2,531,440 | Jordan | Nov. 28, 1950 |
| 2,531,825 | Peterson et al. | Nov. 28, 1950 |
| 2,554,222 | Stross | May 22, 1951 |
| 2,681,314 | Skinner et al. | June 15, 1954 |
| 2,691,593 | Averdikian | Oct. 12, 1954 |
| 2,750,343 | Beber | June 12, 1956 |

OTHER REFERENCES

Jordan: J. of Physical and Colloid Chem., vol. 53, pp. 300, 301, 304, February 1949.

Surface Active Agents by Schwartz et al., pp. 233, 378, 502, pub. by Interscience Pub. Inc., N.Y. (1949).

Synthetic Detergents by McCutcheon, pp. 394, 420, pub. by MacNair-Dorland Co., N.Y. (1950).